United States Patent
Heo et al.

(10) Patent No.: US 8,098,500 B2
(45) Date of Patent: Jan. 17, 2012

(54) PHASE SHIFT FULL BRIDGE CONVERTER WITH REDUCED CURRENT STRESS

(75) Inventors: Tae Won Heo, Gyeonggi-do (KR); Gun Woo Moon, Daejeon-si (KR); Woo Jin Lee, Daejeon-si (KR); Ki Bum Park, Daejeon-si (KR); Don Sik Kim, Gyeonggi-do (KR); Chong Eun Kim, Daejeon-si (KR); Jong Pil Kim, Gyeonggi-do (KR); Sang Cheol Bong, Gyeonggi-do (KR); Hak Ryong Kim, Gyeonggi-do (KR); Dong Joong Kim, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 618 days.

(21) Appl. No.: 12/234,245

(22) Filed: Sep. 19, 2008

(65) Prior Publication Data
US 2010/0002471 A1    Jan. 7, 2010

(30) Foreign Application Priority Data
Jul. 4, 2008 (KR) .................. 10-2008-0064892

(51) Int. Cl.
*H02M 3/335* (2006.01)
*H02M 3/18* (2006.01)

(52) U.S. Cl. ........................ 363/17; 363/56.02
(58) Field of Classification Search ............ 363/16, 363/17, 20, 21.01, 21.02, 21.04, 21.06, 56.01, 363/56.02, 97, 98, 131, 132
See application file for complete search history.

(56) References Cited

U.S. PATENT DOCUMENTS

| 6,356,462 | B1 | 3/2002 | Jang et al. | |
| 6,888,728 | B2 * | 5/2005 | Takagi et al. | 363/17 |
| 7,450,401 | B2 * | 11/2008 | Iida | 363/16 |
| 7,706,156 | B2 * | 4/2010 | Hsieh et al. | 363/21.02 |
| 7,796,406 | B2 * | 9/2010 | Lev | 363/21.02 |
| 7,911,810 | B2 * | 3/2011 | Shimada et al. | 363/17 |
| 2009/0251938 | A1 * | 10/2009 | Hallak | 363/132 |

FOREIGN PATENT DOCUMENTS
KR    10-2001-0095453 A    11/2001
* cited by examiner

*Primary Examiner* — Matthew Nguyen
(74) *Attorney, Agent, or Firm* — McDermott Will & Emery LLP

(57) ABSTRACT

A phase shift full bridge converter with a reduced current stress includes: a switching unit that switches an input voltage; a transformer that includes a first capacitor serially connected to, and having a primary side and a secondary side; an auxiliary circuit unit that includes a first switch, a second switch, and a second capacitor, which are connected in parallel to the secondary side of the transformer; and a rectification unit that is connected to the auxiliary circuit unit, with an output inductor being removed.

5 Claims, 3 Drawing Sheets

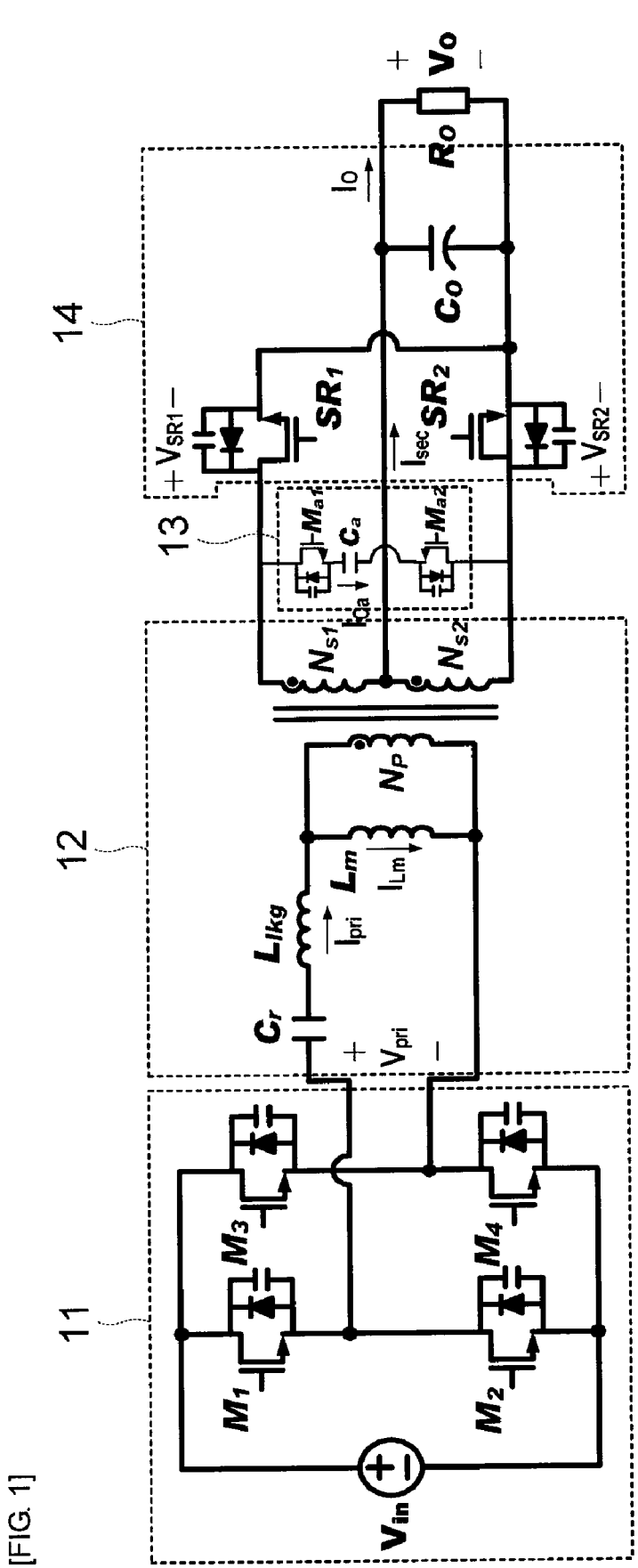
[FIG. 1]

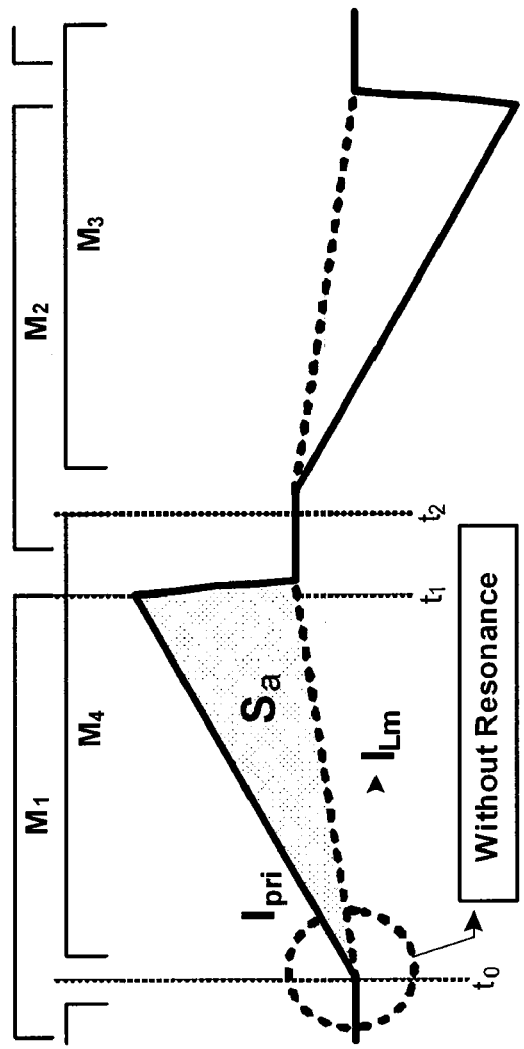
[FIG. 2]
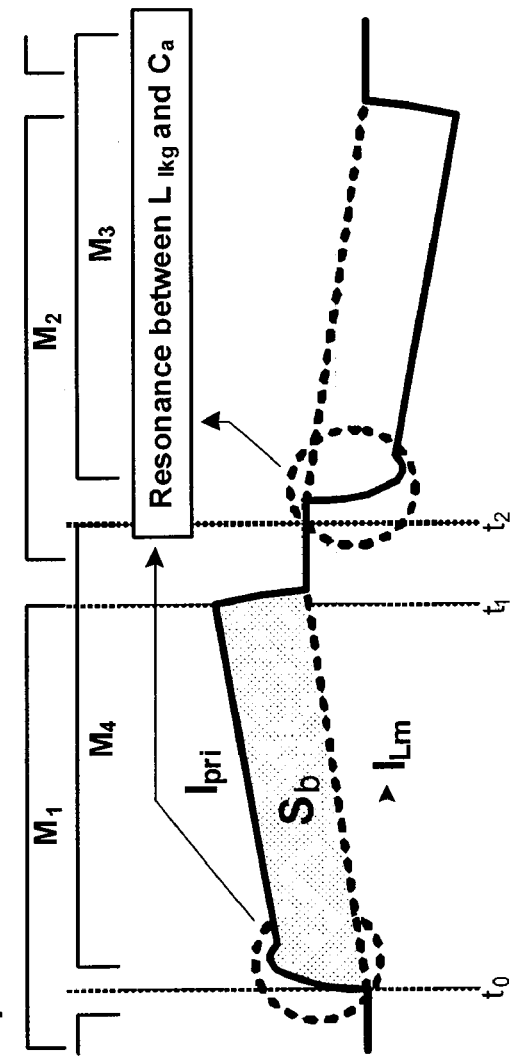
[FIG. 3]

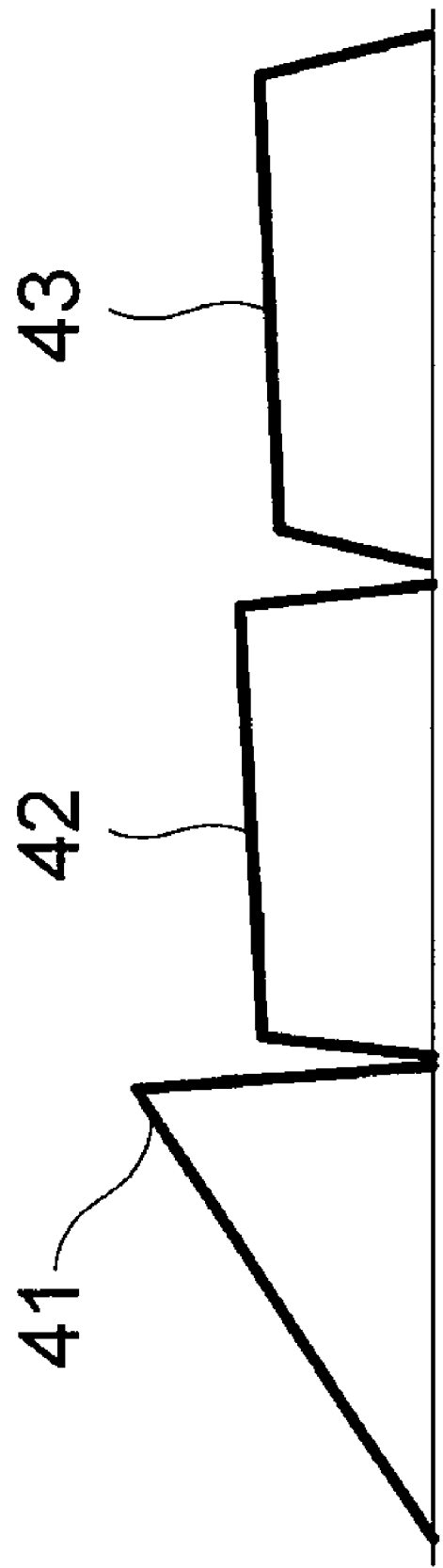

PHASE SHIFT FULL BRIDGE CONVERTER WITH REDUCED CURRENT STRESS

CROSS-REFERENCE TO RELATED APPLICATIONS

This application claims the benefit of Korean Patent Application No. 10-2008-0064892 filed with the Korean Industrial Property Office on Jul. 4, 2008, the disclosure of which is incorporated herein by reference.

BACKGROUND OF THE INVENTION

1. Field of the Invention

The present invention relates to a phase shift full bridge converter, and more particularly, to a phase shift full bridge converter which is capable of reducing current stress by removing an output inductor and adding an auxiliary circuit unit to a secondary side of a transformer.

2. Description of the Related Art

Recently, a power supply circuit supplies power from a general-use input line (85 Vac~265 Vac) through a power factor correction circuit to a DC/DC voltage terminal, and the power is transformed into a desired power at the DC/DC voltage terminal.

The power factor correction circuit is used in order to meet harmonics regulation that is recently reinforced internationally. The power factor correction circuit mainly employs a boost converter. Due to characteristics of the boost converter, its output is always higher than its input. Therefore, the output of the power correction circuit, that is, the input of the DC/DC voltage terminal, becomes 385 Vdc~415 Vdc. In view of the DC/DC voltage terminal, a specification of a high input voltage is necessarily required when the power factor correction circuit is used.

A recent trend is to require an output specification of a low voltage and a high current as the output of the DC/DC voltage terminal. As one method for reducing power consumption of communication devices and processors, low-voltage processors are widely used. In addition, for user's convenience, functions of processors increase and thus their power consumption also increase. Therefore, most DC/DC voltage circuits have an output specification of a low voltage and a high current.

Recently, the main considerations of the DC/DC voltage terminal are a voltage stress at a primary side and a current stress at a secondary side as the specifications of a high input voltage, a low output voltage, and a high output current. Furthermore, in order for high power density, the power supply should have a simple structure and a small volume. To this end, an output filter and an input filter are made in small size by increasing a switching frequency. However, as the switching frequency increases, a total efficiency is reduced due to loss generated in the switching. Therefore, there is required a zero voltage switching that can reduce the switching loss. Moreover, conduction loss should be reduced by implementing a rectification terminal of an output unit with a synchronous rectifier instead of a diode. A phase shift full bridge converter is mainly used for meeting the above-described requirements.

In the conventional phase shift full bridge converter, when a duty is small, free wheeling current exists and a zero voltage switching region of a lagging leg switch is narrow. In addition, since an output inductor exists at a position where a high load current flows, it occupies a large volume. Moreover, in magnetic devices, power loss is caused by core loss and conduction loss. Therefore, in the power supply specifications such as a high input voltage, a low output voltage, and a high output current, the phase shift full bridge converter is suitable, but a large-volume output inductor should be used for the specification of the high output current.

To solve the above program, a phase shift full bridge converter having no output inductor was proposed. However, in this case, a leakage inductor of a transformer replaces the role of the output inductor. Thus, since a secondary current operates as a discontinuous conduction mode, there is a problem that increases current stress of a synchronous rectifier of a secondary side in order to supply a high load current.

SUMMARY OF THE INVENTION

An advantage of the present invention is that it provides a phase shift full bridge converter which is capable of reducing current stress by removing an output inductor and adding an auxiliary circuit unit to a secondary side of a transformer.

Additional aspects and advantages of the present general inventive concept will be set forth in part in the description which follows and, in part, will be obvious from the description, or may be learned by practice of the general inventive concept.

According to an aspect of the invention, a phase shift full bridge converter with a reduced current stress includes: a switching unit that switches an input voltage; a transformer that includes a first capacitor serially connected to, and having a primary side and a secondary side; an auxiliary circuit unit that includes a first switch, a second switch, and a second capacitor, which are connected in parallel to the secondary side of the transformer; and a rectification unit that is connected to the auxiliary circuit unit, with an output inductor being removed.

The transformer may include a leakage inductor and reduce current stress by using a resonance between the leakage inductor and the first capacitor The auxiliary circuit unit may include: a first switch; a second capacitor connected to the first switch; and a second switch connected to the second capacitor.

The auxiliary circuit unit may operate at the same time when a free wheeling interval of a synchronous rectifier is completed, and increase a secondary current of the transformer.

The rectification unit may include two synchronous rectifiers and one output capacitor, with an output inductor being removed.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of a phase shift full bridge converter with a reduced current stress according to the present invention;

FIG. 2 illustrates a waveform of a primary current in a conventional phase shift full bridge converter having no output inductor;

FIG. 3 illustrates a waveform of a primary current in a phase shift full bridge converter according to the present invention, where an output inductor is removed and an auxiliary circuit unit is included; and FIG. 4 illustrates a comparison of secondary currents between the conventional phase shift full bridge converter and the phase shift full bridge converter according to the present invention, depending on the presence/absence of the output inductor.

DETAILED DESCRIPTION OF THE PREFERRED EMBODIMENTS

Reference will now be made in detail to the embodiments of the present general concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity.

FIG. 1 is a circuit diagram of a phase shift full bridge converter with reduced current stress according to the present invention.

Referring to FIG. 1, the phase shift full bridge converter includes a switching unit 11, a transformer 12, an auxiliary circuit unit 13, and a rectification unit 14.

The switching unit 11 switches an input voltage through four switches having a full bridge configuration.

The transformer 12 includes a first capacitor $C_r$ serially connected thereto, and has a primary side and a secondary side. In addition, the transformer 12 includes a leakage inductor $L_{lkg}$ and reduces current stress by using a resonance between the leakage inductor $L_{lkg}$ and the first capacitor $C_r$.

The auxiliary circuit unit 13 may include a first switch $M_{a1}$, a second switch $M_{a2}$, and a second capacitor Ca, which are connected in parallel to the secondary side of the transformer 12.

Furthermore, the second capacitor Ca is connected between the first switch $M_{a1}$ and the second switch $M_{a2}$.

The rectification unit 14 is connected to the auxiliary circuit unit 13, and is characterized in that an output inductor is removed.

The rectification unit 14 includes two synchronous rectifiers and one output capacitor, and is characterized in that an output inductor occupying a large volume is removed from a conventional phase shift full bridge converter.

Even when the output inductor does not exist, the phase shift full bridge converter with reduced current stress according to the present invention can make the current stress of the secondary side similar to the case where the output inductor exists.

The auxiliary circuit unit 13 operates at the same time when a free wheeling interval of the synchronous rectifier is terminated, and increases a secondary current. Since the output inductor does not exist, the output voltage is determined by a current flowing into the output capacitor. When the secondary current has a rectangular shape, the current stress is almost similar to the case where the output inductor exists.

FIG. 2 illustrates a waveform of a primary current of the phase shift full bridge converter having no output inductor, and FIG. 3 illustrates a waveform of a primary current of the phase shift full bridge converter according to the present invention, where the output inductor is removed and the auxiliary circuit unit is included.

Referring to FIG. 2, in the case where the output inductor does not exist, Sa becomes a value corresponding to a load current. In this case, it can be seen that the current abruptly increases and the current stress increases. In the case of the phase shift full bridge converter according to the present invention where the output inductor is removed and the auxiliary circuit unit is included, as illustrated in FIG. 3, the current stress does not abruptly increase but constantly increases. Thus, the current stress can be made similar to that of the case where the output inductor exists.

FIG. 4 illustrates a comparison of secondary currents between the conventional phase shift full bridge converter and the phase shift full bridge converter according to the present invention, depending on the presence/absence of the output inductor.

Referring to FIG. 4, due to the operation of the auxiliary circuit unit, the current stress of the phase shift full bridge converter 42 according to the present invention is lower than that of the conventional phase shift full bridge converter 41 having no output inductor. In addition, the current stress of the phase shift full bridge converter 42 according to the present invention is almost identical to that of the conventional phase shift full bridge converter 43 having the output inductor.

According to the present invention, by providing the phase shift full bridge converter that can reduce the current stress of the secondary side similarly to the case where the output inductor exists, even though the output inductor is removed, the flow path of the high current has a simpler structure and a magnetic device having occupied a large volume is not used, thereby removing core loss and conduction loss.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A phase shift full bridge converter with a reduced current stress, comprising:
    a switching unit that switches an input voltage;
    a transformer that includes a first capacitor serially connected thereto, and has a primary side and a secondary side;
    an auxiliary circuit unit that includes a first switch, a second switch, and a second capacitor, which are connected in parallel to the secondary side of the transformer; and
    a rectification unit that is connected to the auxiliary circuit unit, with an output inductor being removed.

2. The phase shift full bridge converter of claim 1, wherein the transformer includes a leakage inductor and reduces current stress by using a resonance between the leakage inductor and the first capacitor.

3. The phase shift full bridge converter of claim 1, wherein the
    the first switch, the second capacitor and the second switch are connected in series in that order and are connected in parallel with the secondary side of the transformer.

4. The phase shift full bridge converter of claim 1, wherein the auxiliary circuit unit operates at the same time when a free wheeling interval of a synchronous rectifier is terminated, and increases a secondary current of the transformer.

5. The phase shift full bridge converter of claim 1, wherein the rectification unit includes two synchronous rectifiers and one output capacitor, with an output inductor being removed.

* * * * *